US 8,635,286 B2

(12) United States Patent
Agrawal et al.

(10) Patent No.: US 8,635,286 B2
(45) Date of Patent: Jan. 21, 2014

(54) MAILING LIST EXPANSION TRACE

(75) Inventors: Sachin O. Agrawal, Jalna (IN); Paul W. Lyons, Jr., Cambridge, MA (US); Albert Silliman, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 11/969,996

(22) Filed: Jan. 7, 2008

(65) Prior Publication Data
US 2009/0177747 A1 Jul. 9, 2009

(51) Int. Cl.
*G06F 15/16* (2006.01)
*G06F 15/173* (2006.01)

(52) U.S. Cl.
USPC ............... 709/206; 709/238; 370/395

(58) Field of Classification Search
USPC .................. 709/206, 238; 370/395
See application file for complete search history.

(56) References Cited

U.S. PATENT DOCUMENTS

| | | | | |
|---|---|---|---|---|
| 5,057,935 A | * | 10/1991 | Williams | 358/402 |
| 6,658,454 B1 | * | 12/2003 | Delany et al. | 709/202 |
| 2002/0023154 A1 | * | 2/2002 | Singh | 709/224 |
| 2003/0191806 A1 | * | 10/2003 | Osterberg et al. | 709/206 |
| 2004/0133775 A1 | * | 7/2004 | Callas et al. | 713/153 |
| 2006/0053293 A1 | * | 3/2006 | Zager et al. | 713/176 |
| 2006/0095524 A1 | * | 5/2006 | Kay et al. | 709/206 |

* cited by examiner

*Primary Examiner* — Ranodhi Serrao
(74) *Attorney, Agent, or Firm* — Cantor Colburn LLP; Ed Choi

(57) ABSTRACT

A method is disclosed for providing a trace of mailing list expansion performed on an electronic message delivered to an electronic mailing list. The method comprises receiving an electronic message addressed to an electronic mailing list having a set of recipients; inserting an informational header line in a message header of the electronic message that is indicative of the electronic mailing list; and relaying the message for delivery to the set of recipients on the electronic mailing list.

10 Claims, 4 Drawing Sheets

MAILING LIST EXPANSION TRACE

BACKGROUND OF THE INVENTION

1. Field of the Invention

Exemplary embodiments of the present invention relate to electronic messaging, and more particularly, to informational header fields in electronic messages.

2. Description of Background

In computer communication networks, one method of communication is electronic mail (email), in which a sending user prepares and sends a message over some form of computer network to a receiving user, usually on a remote system. Most email clients, which are front-end computer programs that are used to read, write, and send email messages, also provide software to facilitate reading, saving, printing and replying to email. Because email messages can be sent at any time across the world as easily as across the office, to a group of people or a single recipient, without the user leaving his or her desk, email can provide considerable benefits over traditional paper based memos and postal systems. Until recently, the use of electronic mail was the single biggest generator of traffic volume on the Internet.

One of the many benefits of email is that it is easy to send a message to many people at once, simply by specifying several recipient addresses. This facilitates easy group communication, because each recipient can then do a group reply to send a response to each of the people who were sent the original message. An electronic mailing list, a special usage of email that allows for the widespread distribution of information to many Internet users, provides a more formalized way for groups to exchange ideas and information. Such a mailing list is similar to a traditional mailing list—a list of names and addresses—as might be kept by an organization for sending publications to its members or customers. An electronic mailing list is essentially an "alias" email address that will result copies of the messages that are sent to this address via Simple Mail Transfer Protocol (SMTP) being resent to all email addresses in a list of recipients on the mailing list when the mailing list is resolved or transformed into the recipient list by an automatic messaging agent (SMTP specifications are defined in "Request for Comment" (RFC) 2821, published by the Internet Society in April 2001, available on the Internet at http://www.ietf./org/rfc/rfc2821.txt, and herein incorporated by reference). Aliases are short forms for email addresses that save typing. The process of transforming and resending is designated "expansion" of the mailing list.

In a "nested list", a recipient on a mailing list can be another mailing list. Nested lists, which can have a hierarchical structure, are used for efficiency reasons and to distribute the management of different parts of the recipient list. Often, particularly in large organizations, a mailing list will be comprised of a deeply nested set of sublists and recipients. Using a hierarchical structure, messages intended for receipt by all recipients on the entire set of lists can be sent to the top list, while messages intended for only a branch of the tree can be sent to the top of that branch (that is, the intended sublist). As a message sent to nested list is relayed through messaging agents en route to the eventual recipients, the top list and each sublist will be expanded by the messaging agent assigned responsibility for that mailing list, and any further required expansion will be left to other "downstream" messaging agents.

The use of nested mailing lists, while efficient for the sender, does not support the use of mail rules for the mailbox files maintained by the recipients' email client applications. As an example, the following scenario is presented involving an enterprise having a developer A who is assigned to the 'Client' project and a product manager B who is responsible for all collaboration product portfolios. A's email address is listed in the 'Client Team—India' mailing list, and therefore, A has set up a mail rule in his email client directing that all received messages addressed to 'Client Team—India' be automatically moved to his custom mail folder called 'Project communications'. Frequently, B needs to send messages to the protected 'Collaboration project teams' mailing list, which in turn resends the messages to the 'Client Team' and 'Server Team' mailing sublists. The 'Client Team' mailing list is set up to further resolve to the 'Client Team—India' and 'Client Team—China' sublists. When B's messages sent to the protected 'Collaboration project teams' mailing list are retrieved by A's email client, A's mail rule will fail to move the messages to the intended custom folder. Rather, because B's messages will be received by A's email client as being addressed to 'Collaboration project teams' and not explicitly addressed to 'Client Team—India', B's messages will likely be received in A's general inbox folder. Because A is a developer, A's email client is not configured to expand the protected 'Collaboration project teams' mailing list to identify B's messages as being ultimately sent to A in his role as a recipient on the 'Client Team—India' mailing list. Furthermore, maintaining a mail rule for each mailing list from which A receives messages may be not efficient, as nested mailing lists tend to be highly dynamic, and A may receive messages from a top mailing list as a recipient on more than one nested sublist of the top mailing list.

SUMMARY OF THE INVENTION

The shortcomings of the prior art can be overcome and additional advantages can be provided through exemplary embodiments of the present invention that are related to a method for providing a trace of mailing list expansion performed on an electronic message delivered to an electronic mailing list. The method comprises receiving an electronic message addressed to an electronic mailing list having a set of recipients; inserting an informational header line in a message header of the electronic message that is indicative of the electronic mailing list; and relaying the message for delivery to the set of recipients on the electronic mailing list.

The shortcomings of the prior art can also be overcome and additional advantages can also be provided through exemplary embodiments of the present invention that are related to computer program products and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented within an MTA along the route of mail message delivery to append a mailing list expansion trace header line to email messages addressed to a mailing list the MTA is responsible for expanding or resolving. In exemplary embodiments, such a header line could be utilized by the recipients of the messages for better application of mail rules to categorize the incoming mail messages.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
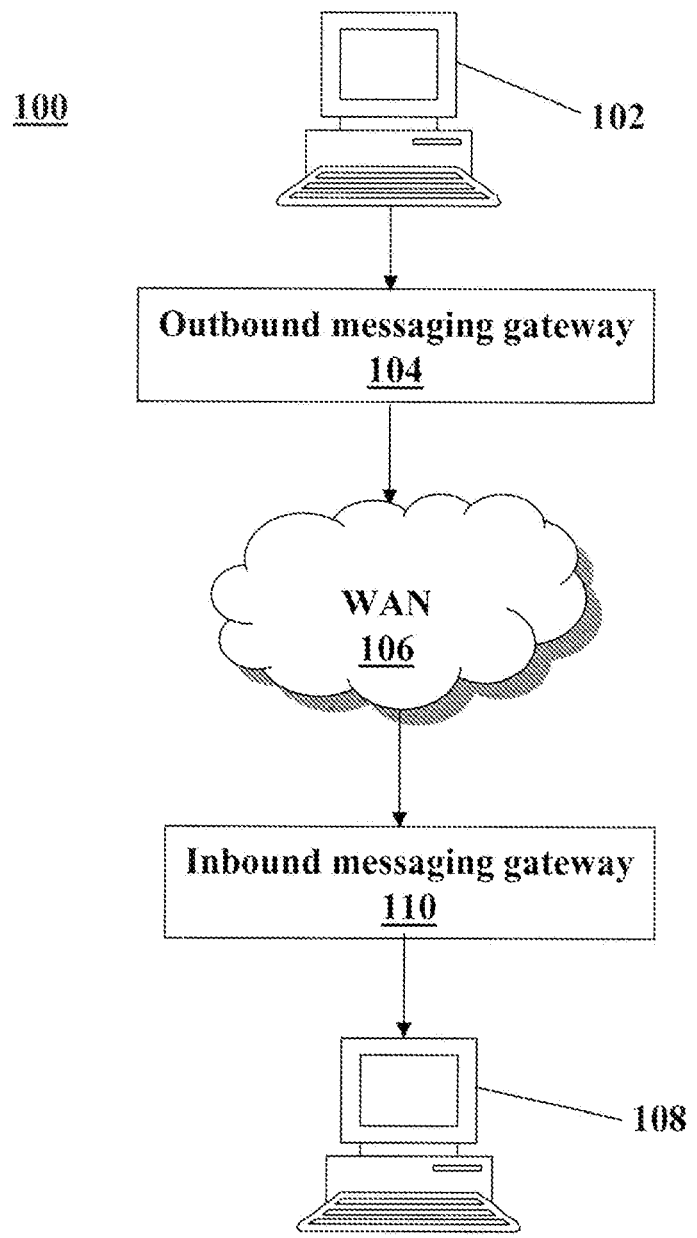
FIG. 1 is a block diagram illustrating an exemplary embodiment of a general system for delivering electronic messages.

Referring now to FIG. 1, a block diagram illustrating an exemplary embodiment of a general system 100 for delivering electronic messages is shown. In exemplary system 100, a sender client computer 102, which is operated by a message sender and associated with an enterprise that owns, operates or is associated with an outbound messaging gateway 104, is connected directly or indirectly through one or more networks to a wide area network (WAN) 106 (for example, the Internet). For purposes of illustrating a simple example, one sender is shown in FIG. 1. In practical exemplary embodiments, however, there may be any number of distributed senders all communicatively coupled to WAN 106, which may forward millions or more messages per day.

In exemplary system 100, a recipient client computer 108, operated by a message recipient, is also connected to WAN 106. Recipient client computer 108 is associated with a receiver that owns, operates, or is associated with an inbound messaging gateway 110. The message recipient represents any of a plurality of entities that may receive messages intended for delivery thereto from the message sender. For purposes of illustrating a simple example, one recipient is shown in FIG. 1. In practical exemplary embodiments, however, there may any number of distributed recipients all connected to WAN 106 that may receive messages from the sender that are intended for ultimately delivery to and reading by the recipient.

At any time, the message sender can operate an email client application running on sender client computer 102 to cause outbound messaging gateway 104 to send one or more messages that are directed to the message recipient. The messages are received at inbound messaging gateway 110 and can be retrieved by the message recipient's email client application running on recipient client computer 108. In exemplary embodiments, the message sender and message recipient can each utilize a myriad of email clients, which range from proprietary email clients (thick clients) to web-based interfaces that retrieve email messages in which the user agent function is provided by a Web server and/or a back-end program (for example, a CGI program) running on the same system as the destination SMTP host.

Each messaging gateway 104, 110 may comprise a general-purpose messaging gateway, also known as a Message Transfer Agent (MTA), mail relay, email relay, email router, Simple Mail Transfer Protocol (SMTP) server, QMQP server, or email gateway, which is specially programmed to perform email message routing functions. Generally, when a message is delivered to a messaging gateway, the gateway must determine whether it can deliver the message locally to its own message store or if it must route the message to another messaging gateway. If the message is sent to another messaging gateway, the other messaging gateway must make the same decisions about the message—deliver locally or route to yet another messaging gateway. In this way, messages are routed throughout, for example, the Internet, until they reach the intended recipient. After a message is successfully delivered to and stored on the correct messaging gateway, the recipient can then retrieve the message. For purposes of illustrating a simple example, one of each messaging gateway is shown in FIG. 1. In practical exemplary embodiments, however, there may be any number of outbound, inbound, and intermediate messaging gateways, and the use of any number of such elements is contemplated.

In exemplary embodiments, the computer systems of client computers 102 and 104 can be one or more Personal Computers (PCs) (for example, IBM or compatible PC workstations running the Microsoft Windows operating system or Linux OS, Macintosh computers running the Mac OS operating system, or equivalent), Personal Digital Assistants (PDAs), hand held computers, palm top computers, smart phones, game consoles, or any other suitable information processing devices. In other exemplary embodiments, the computer systems of one or more of client computers 102 and 104 and boundary mail server 108 can be a server system (for example, SUN Ultra workstations running the SunOS operating system, IBM RS/6000 workstations and servers running the AIX operating system, or an IBM zSeries eServer running z/OS, z/VM or Linux OS). In exemplary embodiments, WAN 106 can be a circuit switched network, such as the Public Service Telephone Network (PSTN), a packet switched network (which can be a wide area network (WAN), such as the global Internet, a private WAN, a telecommunications network or any combination of the above-mentioned networks), a wired network, a wireless network, a broadcast network, or a point-to-point network.

In exemplary embodiments, exemplary system 100 can be configured to be utilized by the message sender for delivering an email message to a mailing list. As described above, a mailing list operates as an automatic agent that has an "alias" email address and will resend copies of the messages, sent to this address via SMTP, to all email addresses in a list of recipients on the mailing list. The mailing list can be created by a list owner or manager using a computer program or software agent such as a robot or list server that can, for example, permit the owner to manage the list, add and remove users, and set parameters that control how the list operates. The mailing list name may be an encoded address of a list name in a server-defined format. In exemplary embodiments, the mailing list can be a nested list that comprises of a nested set of one or more sublists and recipients.

As described above, the process of transforming and resending an email message to all email addresses in a list of recipients on a mailing list is termed "expansion" of the mailing list. Expansion of a mailing list, and of each sublist if the mailing list is a nested list, can be performed along the route of delivery of the message by a Message Transfer Agent (MTA). As will be described, an MTA is a computer program or software agent responsible for accepting email messages and determining how to route them to other computers.

A typical email message consists of lines of ASCII test and is structured to begin with a set of message header lines that is followed by a message text or body, which contains the message author's content. As provided in RFC 2822, the header lines preceding the body are structured fields used to indicate sender, recipient, subject, sending time stamp, receiving time stamps of all intermediate and the final mail transfer agents, and other control information for handling. Each header field has a name and a value. RFC 2822 specifies the precise syntax. Informally, the field name starts in the first character of a line, followed by a colon character (':'), followed by the value, which is continued on non-null subsequent lines that have a space or tab as their first character. Field names and values are restricted to 7-bit ASCII characters, and non-ASCII values may be represented using MIME encoded words. Commonly used header fields include 'Return-Path', 'Received', 'Date', 'From', 'Subject', 'Sender', 'To', and 'cc'. "X-headers" is the generic term for headers starting with a capital X and a hyphen. The 'X-' prefix is used to create custom headers that are legal under RFC 2822 but are non-standard and provided for information only. The convention is that any nonstandard informative header should be given a name starting with 'X-'.

Figure 2:
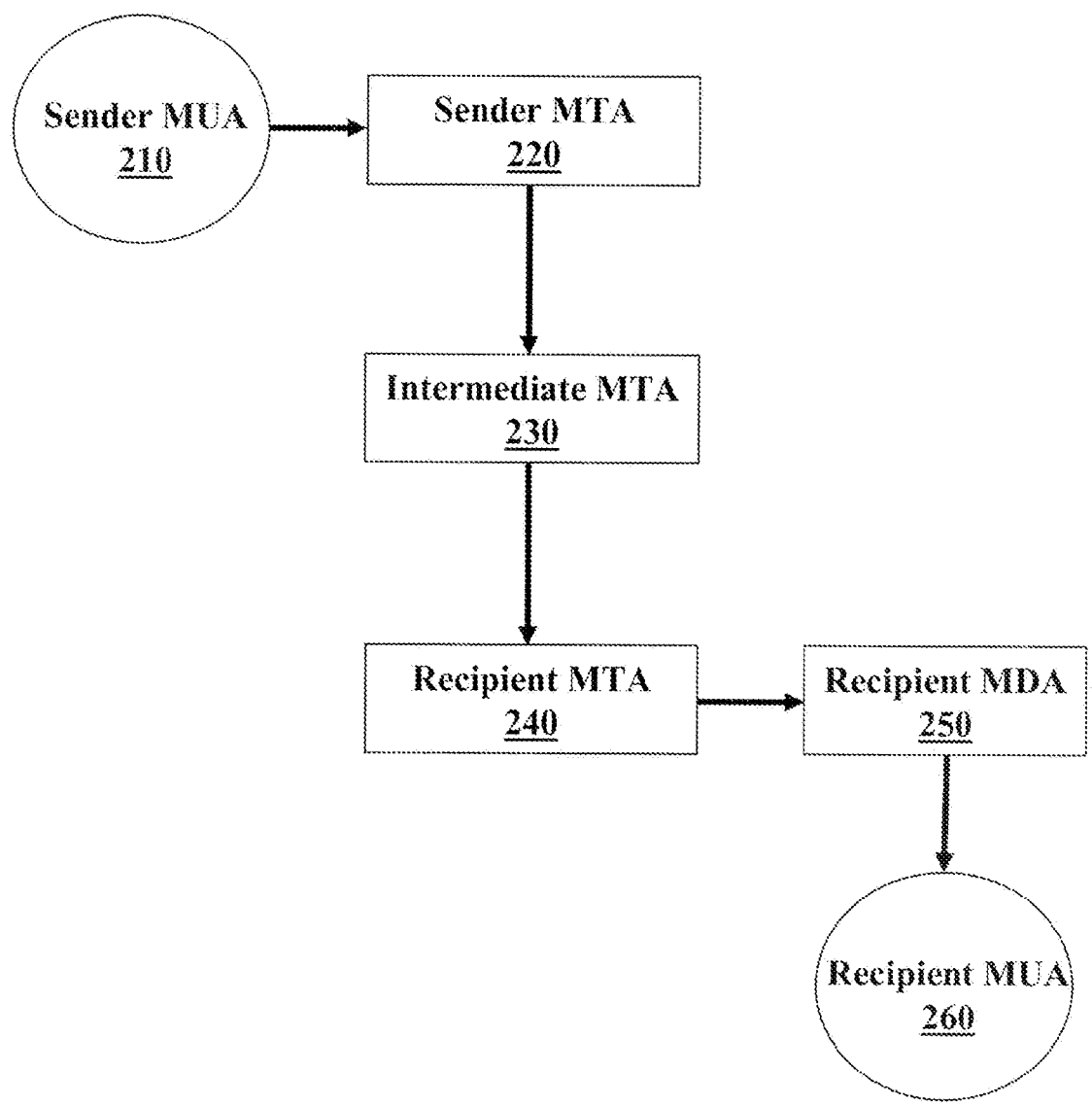
FIG. 2 is a block diagram illustrating an exemplary embodiment of the operation and general control flow of an electronic messaging system for routing and delivering an email message sent via SMTP.

In accordance with exemplary embodiments of the present invention, an MTA along the route of email message delivery can be configured to append a header line to email messages addressed to a mailing list that the MTA is responsible for expanding or resolving. Such a header line could be utilized, for example, by recipients of the messages for better application of mail rules to categorize incoming mail messages. Referring now to FIG. 2, a block diagram is provided illustrating an exemplary embodiment of the operation and general control flow of an electronic messaging system 200 for routing and delivering an email message sent to a nested mailing list via SMTP in accordance with the present invention. In the present exemplary embodiment, the general control flow described will be for routing and delivering the example message from sender B addressed to the protected 'Collaboration project teams' mailing list to recipient A, a recipient on the 'Client Team—India' sublist, as described above. The 'Collaboration project teams' mailing list is configured to resend the message to the 'Client Team' and 'Server Team' mailing sublists. The 'Client Team' mailing list is set up to further resend the message to the 'Client Team—India' and 'Client Team—China' sublists. A's email client (that is, mail user agent, as described below) is configured to retrieve the message when it is delivered to the 'Client Team—India' mailing list.

Exemplary messaging system 200 includes a sender message user agent (MUA) 210, a sender MTA 220, an intermediate MTA 230, a recipient MTA 240, a recipient mail delivery agent (MDA) 250, and a recipient MUA 260. Sender MUA 210 provides the interface between a message sender and sender MTA 220, and recipient MUA 260 provides the interface between a message recipient and recipient MTA 240. Sender MUA 220 is configured to compose and submit new email messages on behalf of the sender, and recipient MUA 260 is configured to process delivered messages on behalf of the recipient so that the messages can be, for example, read, replied to, categorized, disposed of, etc. Example of MUAs include UNIX/bin/mail, the Berkely Mail program and it's System V equivalent mailx, software programs like mush, elm, mutt, mh, Pine, Pegasus, and commerical programs like Eudora.

MTAs 220, 230, 240 are configured to essentially operate as mail routers, as described above, acting as SMTP servers to accept messages from an MUA or another MTA, store them locally and temporarily for analysis of the recipients, and either deliver them to an MDA or act as an SMTP client to relay the messages to another MTA. Each MTA can be configured to edit and/or add to the message headers and can be configured with valid Domain Name system (DNS) records, used by MTAs to determine where to deliver messages for particular addresses, and MX records, which are a type of DNS records specifying how messages should be routed. Examples of MTAs include UNIX sendmail, mmdf, smail, ZMailer, Exim, and Microsoft Exchange Server. Recipient MDA 250 is configured to perform actual delivery of messages to the recipient's mailbox file. Recipient MDA 250 defines the structure of the mail store and can include, for example, the ability to filter mail and to reformat its contents. Examples of MDAs include uux, procmail, and maildrop. In exemplary embodiments, recipient MDA 250 can be hardwired into recipient MTA 240.

In the present exemplary embodiment, when sender B initiates delivery of the message to the protected 'Collaboration project teams' mailing list, the message is delivered from sender MUA 210 to sender MTA 220, which is configured with responsibility for expanding the 'Collaboration project teams' mailing list. Sender MTA 220, upon looking up the destination's MX records with a DNS lookup and then expanding the 'Collaboration project teams' address, determines that it should forward a copy of the message individually to the 'Client Team' and 'Server Team' sublists in addition to any other specified recipients. Before forwarding, however, sender MTA 220 appends the following mailing list expansion trace header line in X-header format to the message's header: "X-IBM-MailinglistExpansionTrace-01: Collaboration project teams".

Intermediate MTA 230 is configured with responsibility for expanding the 'Client Team' mailing list, and therefore, a copy of the message, which now includes the appended "X-IBM-MailinglistExpansionTrace-01: Collaboration project teams" header line, is delivered from sender MTA 220 to intermediate MTA 230. Intermediate MTA 230, upon looking up the destination's MX records with a DNS lookup and then expanding the 'Client Team' address, determines that it should forward a copy of the message individually to the 'Client Team—India' and 'Client Team—China' sublists in addition to any other specified recipients. Before forwarding, however, intermediate MTA 230 appends the following mailing list expansion trace header line in X-header format to the message's header: "X-IBM-MailinglistExpansionTrace-02: Client Team".

Recipient MTA 240 is configured with responsibility for expanding the 'Client Team—India' mailing list, and therefore, a copy of the message, which now includes the two appended mailing list expansion trace header lines specified above, is delivered from intermediate MTA 230 to recipient MTA 240. Recipient MTA 240, upon looking up the destination's MX records with a DNS lookup and then expanding the 'Client Team—India' address, determines that it should forward a copy of the message individually to A's email address in addition to any other specified recipients. Before forwarding, however, recipient MTA 240 appends the following mailing list expansion trace header line in X-header format to the message's header: "X-IBM-MailinglistExpansionTrace-03: Client Team—India".

The copy of the message that is forwarded to A's email address is delivered via a recipient MDA 250 to a server that is designated for local mail delivery to A's mailbox, where the message is stored by retrieval by recipient MUA 260, A's email client. Generally, mail retrieval can be performed using either a type of online folders (for example, the Internet Message Access Protocol (IMAP)) or the older single repository format (for example, the Post Office Protocol (POP)). Webmail email clients may use either method, but the retrieval protocol is often not a formal standard.

At this point in the present exemplary routing delivery control flow, the message has been appended with three mailing list expansion trace header lines, "X-IBM-MailinglistExpansionTrace-01: Collaboration project teams", "X-IBM-MailinglistExpansionTrace-02: Client Team", and "X-IBM-MailinglistExpansionTrace-03: Client Team—India", which can allow recipient A to set up mail rules in his email client such as, for example, "Move all messages containing 'Client Team—India' in a mailing list expansion trace header line to the custom folder 'Project Communications'".

It should be noted that the system illustrated in FIG. 2 is intended to be exemplary and non-limiting. It is considered that systems implementing exemplary embodiments of the present invention can be configured to route and deliver mailing lists that comprise sets of nested sublists of any depth, and that the control flow of email messages delivered via systems implementing exemplary embodiments of the present invention can be routed through any number of MTAs and other messaging gateway, message handling, and message relaying components, including components not shown in the exemplary system of FIG. 2 such as, for example, mail submission agents and mail access agents. Additionally, the format provided for the appended mailing list expansion trace header line in the example above is also considered to be non-limiting, and any suitable format for the appended header line can be used in exemplary embodiments.

Further, it can be expected that, in some exemplary embodiments, not all of the MTA's involved in message routing in exemplary systems will be configured to append mailing list expansion trace header lines to the headers of messages for which mailing list expansion is performed. In these situations, it is expected that these non-participating MTAs will relay messages containing mailing list expansion trace header lines appended by other MTAs without removing these appended header lines, as MTAs generally are not configured to reformulate header lines that are not addressed. Thus, participating and non-participating MTAs will be compatible with one another, and some messages delivered to recipients through such systems may include incomplete traces.

Figure 3:
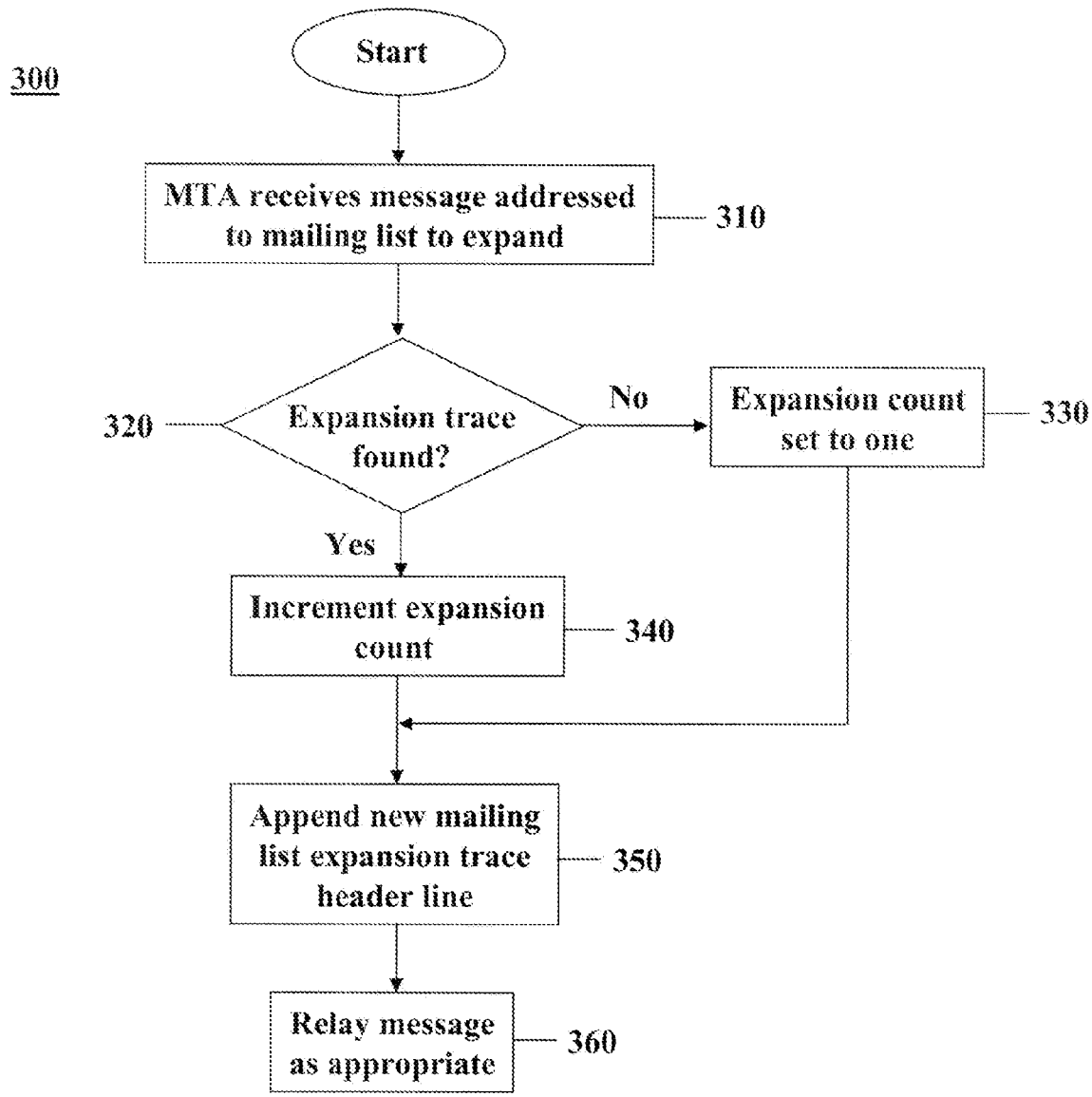
FIG. 3 is a flow diagram illustrating an exemplary embodiment of a process that can be implemented within an MTA for appending mailing list expansion trace header lines to an email message.

Referring now to FIG. 3, an exemplary embodiment of a process 300 that can be implemented within an MTA for appending mailing list expansion trace header lines to an email message addressed to a mailing list to which the MTA is routing the message. In exemplary process 300, at block 310, the MTA receives an email message addressed to a mailing list for which the MTA has responsibility for expanding. At decision block 320, the MTA examines the message header to determine if any mailing list expansion trace header lines have been appended by other MTAs preceding the present MTA in the chain of message relaying and delivery. If no mailing list expansion trace header lines are found, the process proceeds to block 330, at which an expansion count for the message is initialized to one. If any mailing list expansion trace header lines are found, the process proceeds to block 340, at which the expansion count is incremented. At block 350, the MTA appends a new mailing list expansion trace header line to the message that indicates the current expansion count and the mailing list name. Finally, at block 360, the MTA relays a copy or copies of the message, now having the appended mailing list expansion trace header line, as appropriate (delivers the message to the appropriate MDA(s) and/or acts as an SMTP client to relay the message to another MTA or other MTAs).

Exemplary embodiments of the present invention can be realized in hardware, software, or a combination of hardware and software. Exemplary embodiments can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 4:
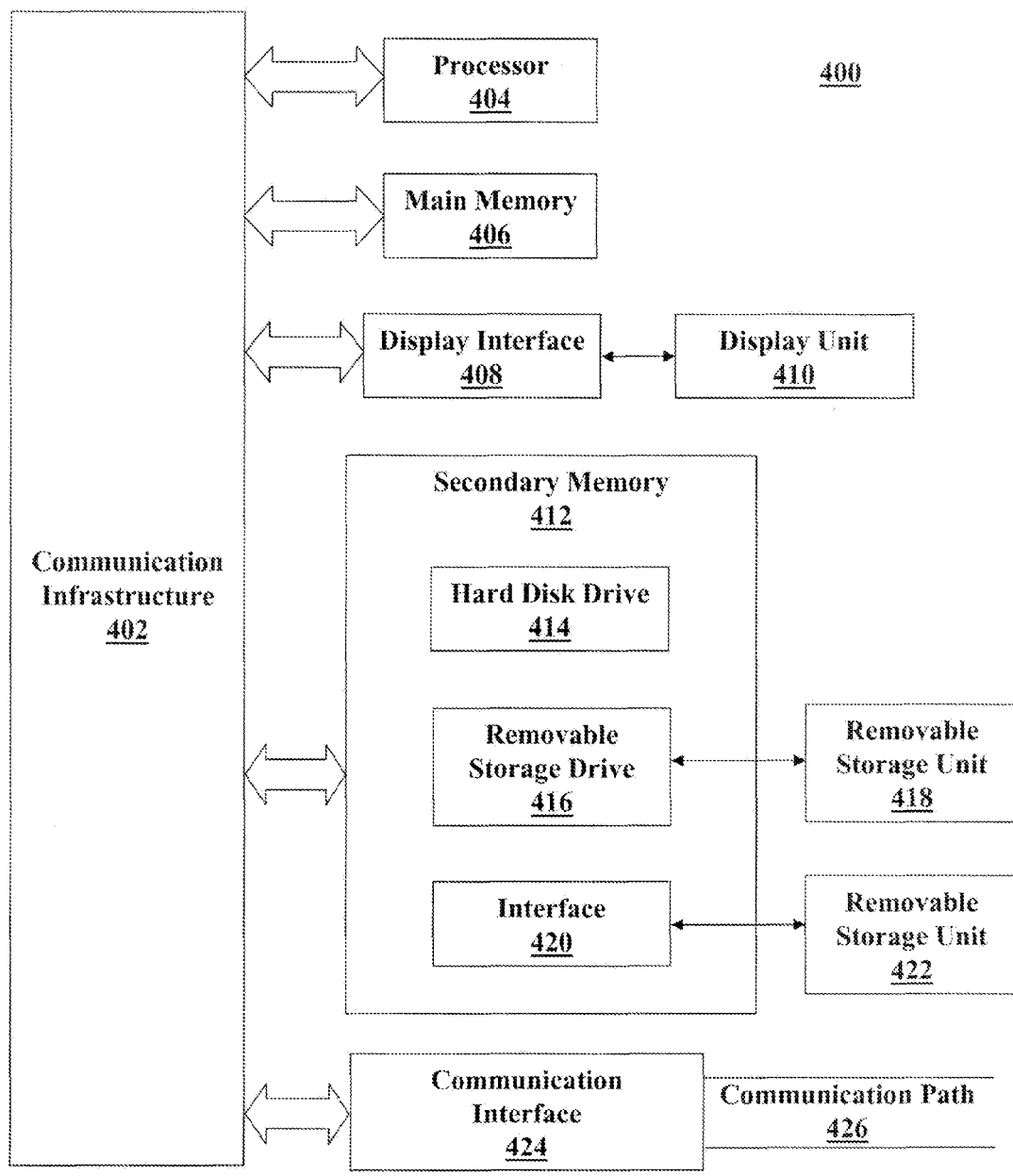
FIG. 4 is a block diagram illustrating an exemplary computer system that can be used for implementing exemplary embodiments of the present invention.

FIG. 4 is a block diagram of an exemplary computer system 400 that can be used for implementing exemplary embodiments of the present invention. Computer system 400 includes one or more processors, such as processor 404. Processor 404 is connected to a communication infrastructure 402 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 that forwards graphics, text, and other data from the communication infrastructure 402 (or from a frame buffer not shown) for display on a display unit 410. Computer system 400 also includes a main memory 406, which can be random access memory (RAM), and may also include a secondary memory 412. Secondary memory 412 may include, for example, a hard disk drive 414 and/or a removable storage drive 416, representing a floppy disk drive, a magnetic tape drive, an optical disk drive, etc. Removable storage drive 416 reads from and/or writes to a removable storage unit 418 in a manner well known to those having ordinary skill in the art. Removable storage unit 418, represents, for example, a floppy disk, magnetic tape, optical disk, etc. which is read by and written to by removable storage drive 416. As will be appreciated, removable storage unit 418 includes a computer usable storage medium having stored therein computer software and/or data.

In exemplary embodiments, secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between the computer system and external devices. Examples of communications interface 424 may include a modem, a network interface (such as an Ethernet card), a communications port, a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (that is, channel) 426. Channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 406 and secondary memory 412, removable storage drive 416, a hard disk installed in hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 406 and/or secondary memory 412. Computer programs may also be received via communications interface 424. Such computer programs, when executed, can enable the computer system to perform the features of exemplary embodiments of the present invention as discussed herein. In particular, the computer programs, when executed, enable processor 404 to perform the features of computer system 400. Accordingly, such computer programs represent controllers of the computer system.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for providing a trace of mailing list expansion performed on an electronic message delivered to an electronic mailing list, the method comprising:

receiving the electronic message addressed to an electronic mailing list having a set of recipients;

inserting an informational header line in a message header of the electronic message, the informational header line including an identification of a name of the electronic mailing list;

relaying the message for delivery to the set of recipients on the electronic mailing list;

examining the message header to determine if any informational header lines indicative of any other electronic mailing lists have been inserted by any other mail transfer agents preceding a mail transfer agent in a route of delivery, initializing an expansion count for the electronic message to one if no informational header lines indicative of any other electronic mailing lists have been inserted, incrementing the expansion count by one if any informational header lines indicative of any other electronic mailing lists have been inserted, and including an indication of the expansion count in the informational header line; and wherein the electronic mailing list is a sublist of a nested mailing list.

2. The method of claim 1, wherein the method is performed by a mail transfer agent responsible for expanding the mailing list along a route of delivery of the electronic message.

3. The method of claim 1, wherein the informational header is utilized by a recipient of the electronic message in applying mail rules to categorize incoming mail messages.

4. A non-transitory computer readable medium having instructions for causing a computer to execute the method of claim 1.

5. A method for providing a trace of mailing list expansion performed on an electronic message delivered to an electronic mailing list, the method comprising:

receiving the electronic message addressed to an electronic mailing list having a set of recipients;

inserting an informational header line in a message header of the electronic message, the informational header line including an identification of a name of the electronic mailing list;

relaying the message for delivery to the set of recipients on the electronic mailing list; and examining the message header to determine if any informational header lines indicative of any other electronic mailing lists have been inserted by any other mail transfer agents preceding a mail transfer agent in a route of delivery, initializing an expansion count for the electronic message to one if no informational header lines indicative of any other electronic mailing lists have been inserted, incrementing the expansion count by one if any informational header lines indicative of any other electronic mailing lists have been inserted, and including an indication of the expansion count in the informational header line;

wherein the electronic mailing list is a nested list, and wherein the set of recipients on the electronic mailing list includes a sublist.

6. A non-transitory computer readable medium having instructions for causing a computer to execute the method of claim 5.

7. A system for providing a trace of mailing list expansion performed on an electronic message delivered to an electronic mailing list, the system comprising:

a computer processor device; and computer control logic executable by the computer processor device, the logic configured to implement a method, the method comprising:

receiving the electronic message addressed to an electronic mailing list having a set of recipients;

inserting an informational header line in a message header of the electronic message, the informational header line including an identification of a name of the electronic mailing list;

relaying the message for delivery to the set of recipients on the electronic mailing list; and examining the message header to determine if any informational header lines indicative of any other electronic mailing lists have been inserted by any other mail transfer agents preceding a mail transfer agent in a route of delivery, initializing an expansion count for the electronic message to one if no informational header lines indicative of any other electronic mailing lists have been inserted, incrementing the expansion count by one if any informational header lines indicative of any other electronic mailing lists have been inserted, and including an indication of the expansion count in the informational header line;

wherein the electronic mailing list is a sublist of a nested mailing list.

8. The system of claim 7, wherein:

the mail transfer agent is responsible for expanding the mailing list along the route of delivery of the electronic message.

9. The system of claim 7, wherein the informational header is utilized by a recipient of the electronic message in applying mail rules to categorize incoming mail messages.

10. The system of claim 7, wherein the electronic mailing list is a nested list, and wherein the set of recipients on the electronic mailing list includes a sublist.

\* \* \* \* \*